US009869342B2

(12) United States Patent  (10) Patent No.: US 9,869,342 B2
Bruestle  (45) Date of Patent: Jan. 16, 2018

(54) PIVOT BEARING FOR TWO CONNECTING RODS

(71) Applicant: Neander Motors AG, Kiel (DE)

(72) Inventor: Claus Bruestle, Nordheim (DE)

(73) Assignee: Neander Motors AG, Kiel (DE)

(*) Notice: Subject to any disclaimer, the term of this patent is extended or adjusted under 35 U.S.C. 154(b) by 0 days.

(21) Appl. No.: 15/285,649

(22) Filed: Oct. 5, 2016

(65) Prior Publication Data

US 2017/0114827 A1  Apr. 27, 2017

(30) Foreign Application Priority Data

Oct. 21, 2015 (DE) .................. 10 2015 013 631

(51) Int. Cl.
*F16C 9/04* (2006.01)
*F02B 75/06* (2006.01)
(Continued)

(52) U.S. Cl.
CPC ............. *F16C 9/04* (2013.01); *F01B 1/10* (2013.01); *F02B 75/065* (2013.01); *F16F 15/26* (2013.01);
(Continued)

(58) Field of Classification Search
CPC .. F16C 19/04; F16C 2204/66; F16C 2360/22; F01B 1/10; F02B 75/065; F16F 15/26; F16J 1/16
(Continued)

(56) References Cited

U.S. PATENT DOCUMENTS 4,841,928 A * 6/1989 Paul .................... F01B 7/14
123/193.4
5,435,232 A * 7/1995 Hammerton .......... F02B 75/065
123/197.4
(Continued)

FOREIGN PATENT DOCUMENTS

DE  10 2006 053 923 A1  5/2008
DE  10 2010 051 682 B4  7/2012
(Continued)

OTHER PUBLICATIONS

German-language European Search Report issued in counterpart European Application No. 16002064.0 dated Mar. 30, 2017 with partial English translation (eight pages).

*Primary Examiner* — Marcus Charles
(74) *Attorney, Agent, or Firm* — Crowell & Moring LLP

(57) ABSTRACT

A pivot bearing suitable for two connecting rods in at least one piston of an internal combustion engine having two crankshafts, includes radial bearing regions that are provided with bolt boreholes and are disposed on either side of a center longitudinal plane of the piston and delimit connecting rod ends, forming an intermediate space. The bearing regions are designed as cylinder bodies having a crucible-like cross-section, of which each cylinder body has a base wall and a bearing ring jacket. The base walls of the two cylinder bodies extend at a distance from each other, and the bearing ring jackets surrounding the base walls are guided away from the base walls in opposite directions. One or more connecting supports run between the base walls. The bearing ring jackets cooperate with the piston boreholes in a rotatably movable manner. The base walls are connected to bearing bushings which are oriented in the axial direction of the pivot bearing and into which the bolt boreholes are incorporated. The pivot bearing is made of a material that
(Continued)

brings about a targeted low-weight construction of the pivot bearing, while offering high strength and low wear.

11 Claims, 4 Drawing Sheets

(51) Int. Cl.
*F01B 1/10* (2006.01)
*F16F 15/26* (2006.01)
*F16J 1/14* (2006.01)
*F16J 1/16* (2006.01)

(52) U.S. Cl.
CPC ...... *F16C 2204/66* (2013.01); *F16C 2360/22* (2013.01); *F16J 1/14* (2013.01); *F16J 1/16* (2013.01)

(58) Field of Classification Search
USPC ......... 384/11, 129, 192, 288, 294, 912, 216, 384/270; 123/193.5, 193.6, 197.2, 197.4; 74/579 R, 579 E
See application file for complete search history.

(56) References Cited

U.S. PATENT DOCUMENTS

| | | | | |
|---|---|---|---|---|
| 5,595,147 A * | 1/1997 | Feuling | ................ | F02B 75/065 123/197.1 |
| 5,680,840 A * | 10/1997 | Mandella | ................ | F02B 75/04 123/197.4 |
| 5,682,844 A * | 11/1997 | Wittner | ................ | F02B 75/045 123/197.3 |
| 5,716,197 A * | 2/1998 | Paul | ........................ | F02B 63/06 417/228 |
| 5,769,610 A * | 6/1998 | Paul | ........................ | F02B 63/06 417/228 |
| 5,836,273 A * | 11/1998 | Hair | ...................... | F02B 75/065 123/197.4 |
| 6,209,496 B1 * | 4/2001 | Pelz | ...................... | F02B 75/065 123/197.3 |
| 6,447,268 B1 * | 9/2002 | Abramopaulos | ......... | F01C 1/32 123/52.2 |
| 7,240,647 B2 * | 7/2007 | Betzmeir | .............. | F02B 75/065 123/196 R |
| 7,434,562 B2 * | 10/2008 | Ishimitsu | .............. | F02B 75/065 123/197.2 |
| 8,360,028 B2 * | 1/2013 | Betzmeir | .............. | F02B 75/065 123/196 R |
| 2012/0055443 A1 | 3/2012 | Betzmeir et al. | | |

FOREIGN PATENT DOCUMENTS

| | | |
|---|---|---|
| DE | 10 2013 009 250 A1 | 12/2014 |
| EP | 2 426 336 A2 | 3/2012 |
| EP | 2 792 846 A1 | 10/2014 |
| JP | 61-149745 U | 9/1986 |
| WO | WO-2006117060 A9 * | 1/2008 ............ F02B 75/065 |

* cited by examiner

PIVOT BEARING FOR TWO CONNECTING RODS

CROSS REFERENCE TO RELATED APPLICATIONS

This application claims priority under 35 U.S.C. §119 from German Patent Application No. 10 2015 013 631.3, filed Oct. 21, 2015, the entire disclosure of which is herein expressly incorporated by reference.

BACKGROUND AND SUMMARY OF THE INVENTION

The invention relates to a pivot bearing for two connecting rods in at least one piston of an internal combustion engine comprising two crankshafts, which are driven by way of the piston and the connecting rods.

A pivot bearing for a piston of an internal combustion engine is known from EP 2 426 336 A2, which is designed to accommodate two connecting rods. The connecting rods of the piston cooperate with two crankshafts of the internal combustion engine and are disposed so as to be relatively movable by way of connecting rod eyes, mediated by connecting rod pins inserted into boreholes of the eyes. An intermediate space for the connecting rod eyes is provided between the connecting rod bearings. This pivot bearing is used to compensate for the system-related asymmetry during rotation of the two crankshafts.

JP 61-149745 relates to an internal combustion engine having a piston. The piston is connected to two crankshafts by way of two connecting rods. The connecting rods are operatively connected to connecting rod eyes having a wrist pin-like bearing pin, which is accommodated in boreholes of spaced, cylindrical bearing disks. The bearing disks, in turn, are inserted into boreholes of the piston in such a way that these are seated against axial stops in the boreholes of the piston. Radial retaining rings are used to axially fix the bearing disks and the bearing pin.

It is the object of the invention to design a pivot bearing for a piston of an internal combustion engine which has a high load-bearing capacity, yet a relatively light weight and which accommodates two connecting rods in an articulated manner, wherein the piston and the connecting rods drive two crankshafts. In doing so, however, the pivot bearing is also to be improved with respect to strength and wear.

This and other objects of the invention are achieved by a pivot bearing for two connecting rods in at least one piston of an internal combustion engine comprising two crankshafts, which are driven by way of the piston and the connecting rods, with the pivot bearing being accommodated in piston boreholes of the piston and having bolt boreholes for mounting connecting rod bolts for connecting rod ends of the connecting rods. The pivot bearing comprises radial bearing regions that are provided with the bolt boreholes and that are disposed on either side of a center longitudinal axis of the piston and delimit the connecting rod ends, forming an intermediate space. The bearing regions of the pivot bearing are designed as cylinder bodies having a crucible-like cross-section, of which each cylinder body has a base wall and a bearing ring jacket. The base walls of the two cylinder bodies extend at a distance from each other, and the bearing ring jackets surrounding the base walls are guided away from the base walls in opposite directions. One or more connecting supports run between the base walls. The bearing ring jackets cooperate with the piston boreholes in a rotatably movable manner. The base walls are connected to bearing bushings which are oriented in the axial direction of the pivot bearing and into which the bolt boreholes are incorporated. The pivot bearing is made of a material which brings about a targeted low-weight construction of the pivot bearing, while offering high strength and low wear.

The advantages that are primarily achieved with the invention can be seen in that the pivot bearing of the piston, which drives two crankshafts of the internal combustion engine mediated by two connecting rods, represents a lightweight component in the crank mechanism of this internal combustion engine causing lower forces of inertia due to the structural design and material selection. The design and material selection positively impact the dynamic engine properties and mechanical stress in the crank mechanism. The two crucible-shaped cylinder bodies with the bearing ring jackets thereof, base walls and bearing walls form exemplary components that are easy to implement. Also emphasized in this context shall be the connection of the two cylinder bodies via the connecting supports, which as a result of an appropriate design allow the necessary stability to be imparted under the stresses that occur by deliberately using lightweight construction measures. It is advantageous if the pivot bearing is made of a material that brings about a targeted low-weight construction of the pivot bearing while offering high strength and low wear. Excellently suited for this purpose is cast steel for components that have a high load-bearing capacity, statically and dynamically, and are subjected to especially high wear, but also an ultra-high carbon (UHC) lightweight steel.

The solution is that three connecting supports are provided between the base walls of the cylinder bodies, of which two connecting supports are provided in the direction of the piston crown of the piston at a distance from the connecting rod eye plane intersecting the centers of the connecting rod bolts of the connecting rod ends on the one hand, and from the center longitudinal axis of the piston on the other hand. The third connecting support, in the direction of the crankshafts, is located spaced from the connecting rod end plane of the center longitudinal axis of the piston.

The installation of the connecting rods is facilitated in that, originating from the first ring section of the cylinder bodies, which is directed to the piston crown to the second, opposing ring section of the cylinder bodies, which is directed toward the crankshafts, the base walls of the cylinder bodies diverge in a V-shaped manner so as to form the intermediate space for the connecting rod ends in a defined manner. The component is optimized when the bearing bushings protrude at a defined distance beyond the radial delimiting planes of the bearing jackets, and also when each bearing ring jacket on an inside in the region of the bearing bushings is provided with the first local thickened sections and is located spaced from the connecting rod end plane between the first thickened sections and the bolt boreholes of the bearing bushings. Moreover, the bearing bushings comprise second thickened sections in the region that faces the crankshafts.

The technical design sets standards, wherein, originating from the inside of the first ring section, one or more reinforcing ribs are provided in the direction of the bearing bushings. This is supported in that, on the one hand, at least one reinforcing rib in the center longitudinal axis of the piston runs radially between the inside and a transverse web that connects the bearing bushings and is located on the connecting rod end plane, and on the other hand, that multiple further ribs combine the inside with the bearing bushing in a secant-like manner.

Finally, another factor in the optimization of the pivot bearing is that the base walls between the connecting rod end plane and the second ring section have one or more through-passages so as to reduce the weight.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
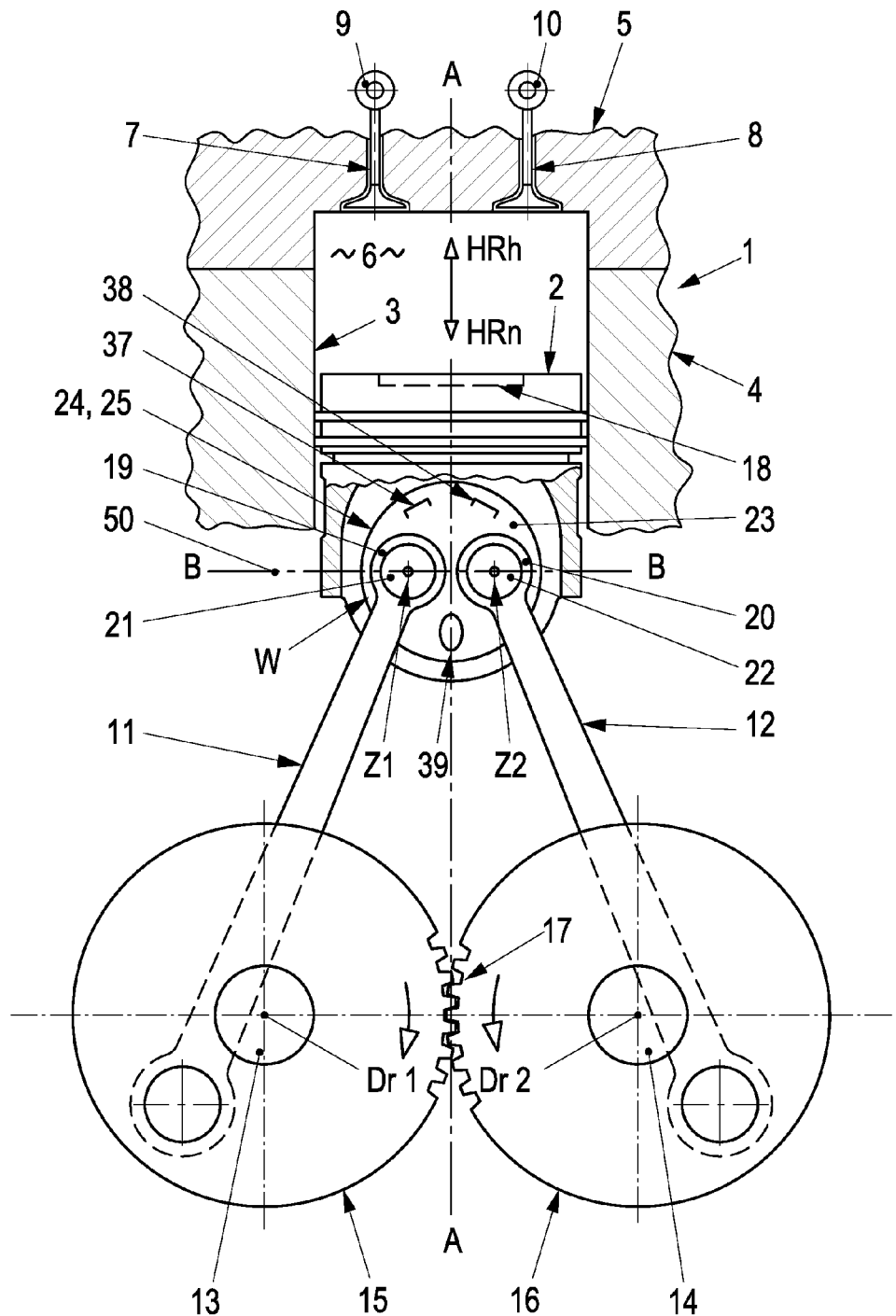
FIG. 1 is a schematic partial cross-section view through an exemplary internal combustion engine comprising a pivot bearing for two connecting rods.
Figure 2:
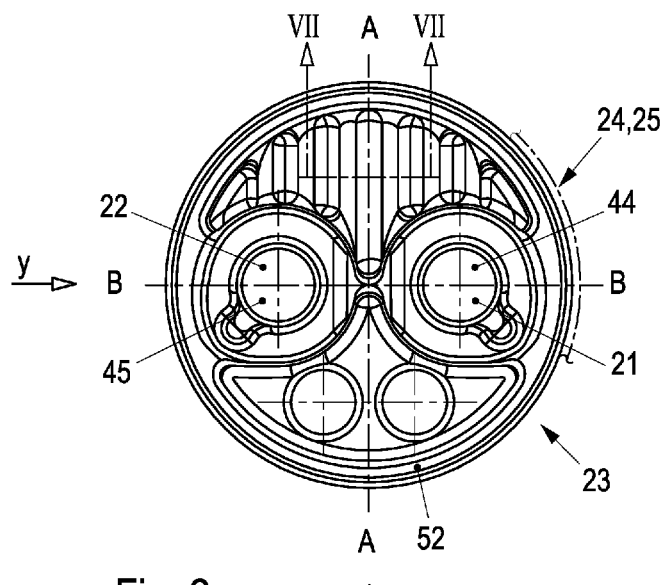
FIG. 2 shows a detail W of the pivot bearing according to FIG. 1.
Figure 3:
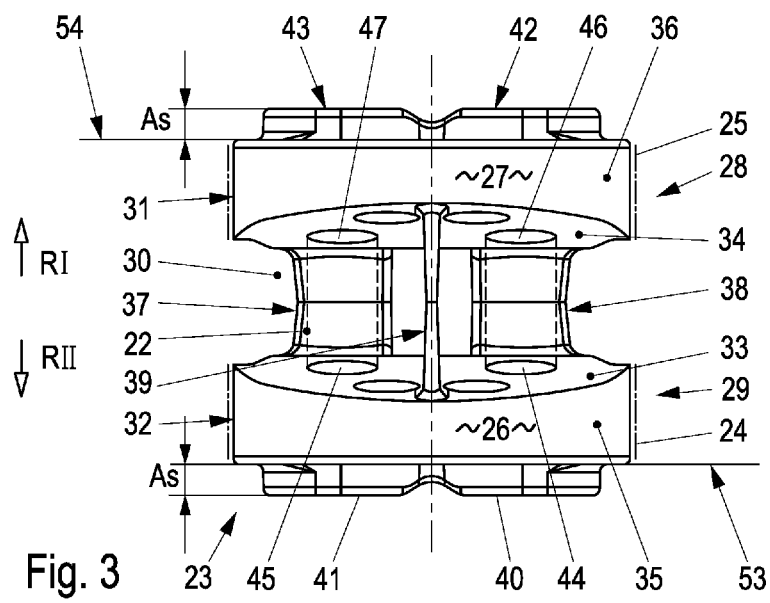
FIG. 3 shows a view in the direction of the arrow X from FIG. 2.

An internal combustion engine 1, FIG. 1, which can be used as an outboard engine, for example, includes at least one piston 2, which carries out stroke movements in the directions HRh and HRn in a cylinder borehole 3 of a cylinder crankcase 4. The internal combustion engine 1 operates as a four-cycle engine according to a diesel method using direct injection and is equipped with an exhaust gas turbocharger, which is not shown. The cylinder crankcase 4 carries a cylinder head 5, which together with a sub-region of the cylinder borehole 3 delimits a combustion chamber 6. To control the fuel/air mixture and the exhaust gases in the combustion chamber 6, at least one intake valve 7 and one exhaust valve 8 are provided, which are actuated by way of overhead camshafts 9 and 10.

The piston 2 is coupled to two connecting rods 11 and 12, which are operatively connected to two parallel crankshafts 13 and 14. Two synchronization gear wheels 15 and 16, which are engaged with each other via a spur gear 17, operate between the crankshafts 13 and 14. The synchronization gear wheels 15 and 16 thus rotate synchronously in opposite Dr1 and Dr2.

A center longitudinal axis A-A of the piston 2 or of the cylinder borehole 3 extends between the synchronization gear wheels 15 and 16. On a side facing a piston crown 18 of the piston 2, the connecting rods 11 and 12 have connecting rod ends 19 and 20 fixed on either side of the center longitudinal axis A-A. The connecting rod ends are operatively connected to a pivot bearing 23, which is accommodated in piston boreholes 24 and 25 of the piston 2, by way of interconnected connecting rod bolts 21 and 22 having centers Z1 and Z2. In other words, running surfaces 26 and 27 of the pivot bearing 23 are rotatably inserted into the piston boreholes 24 and 25.

Figure 6:
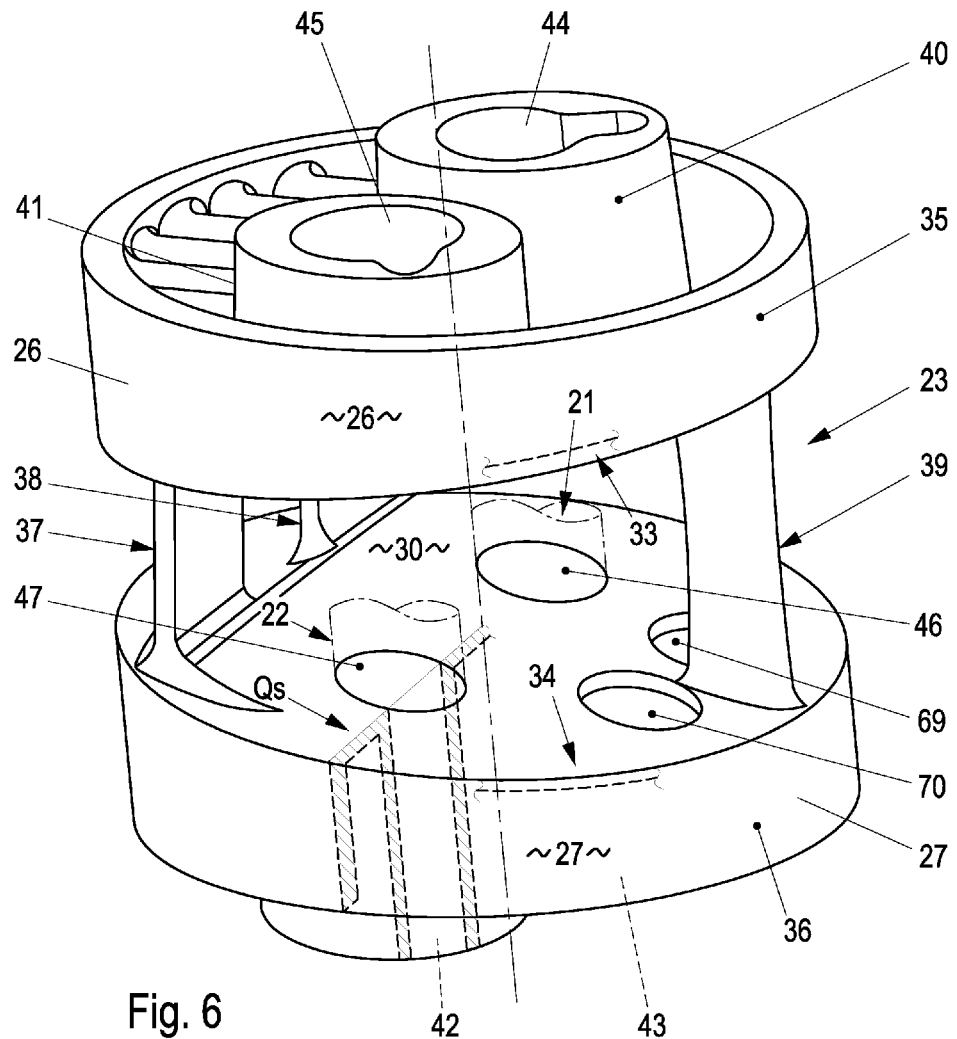
FIG. 6 is a perspective view of the pivot bearing, for example based on FIG. 2 in a local principle cross-section.
Figure 7:
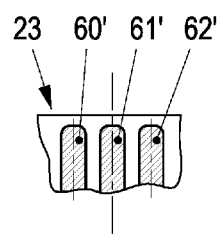
FIG. 7 is a section view along line VII-VII from FIG. 2.

In the region of the piston boreholes 24 and 25 of the piston 2, the pivot bearing 23 is provided with radial bearing regions 28 and 29, which extend on either side of the center longitudinal axis A-A and delimit the connecting rod ends 19 and 20, forming an intermediate space 30. The intermediate space 30 has planes E1 and E2. The bearing regions 28 and 29 are thus designed as cylinder bodies 31 and 32 having a crucible-shaped cross-section Qs, FIG. 6. The cylinder bodies 31 and 32 have approximately radial base walls 33 and 34 extending at a distance from the center longitudinal axis A-A and comprise bearing ring jackets 35 and 36 surrounding the same; the bearing ring jackets carry the running surfaces 26 and 27. Seen from the center longitudinal axis A-A, the bearing ring jackets 35 and 36 are guided away from the base walls 33 and 34 in opposite directions RI and RII. Between the base walls 33 and 34, one or more connecting supports 37, 38, and 39 are active, by way of which the cylinder bodies 31 and 32 are combined to form a casting component combination.

The bearing ring jackets 35 and 36, or the running surfaces 26 and 27, cooperate with the piston boreholes 24 and 25 in a rotatably movable manner. Seen in the axial direction B-B of the pivot bearing 23, the base walls 33 and 34 are connected to bearing bushings 40, 41 and 42, 43. Bolt boreholes 44, 45 and 46, 47 for the connecting rod bolts 21 and 22 mounted in the connecting rod ends 19 and 20 are incorporated into the bearing bushings 40, 41 and 42, 43.

The pivot bearing 23 is made of a material that brings about a targeted lightweight construction of the pivot bearing 23, while offering high strength and low wear. The material can be a cast steel allowing relatively thin walls, particularly for components that have a high static load-bearing capacity and are subjected to especially high wear. However, it is also contemplated to use an ultra-high carbon (UHC) lightweight steel, see, e.g., DE 10 2010 051 682 B4.

The connecting supports 37, 38 and 39 are joined at a distance from the center longitudinal axis A-A to the base walls 33 and 34, more particularly in such a way that two connecting supports 37 and 38 are attached in the direction of the piston crown 18 of the piston 2 at a distance from a connecting rod end transverse plane 50 intersecting the centers Z1 and Z2 of the connecting rod bolts 21 and 22 of the connecting rod end 19 and 20 on the one hand, and at a distance from the center longitudinal axis A-A of the piston 2 on the other hand. The third connecting support 39, in the direction of the crankshafts 13 and 14, is disposed spaced from the connecting rod end transverse plane 50 as well as on the center longitudinal axis A-A.

Figure 4:
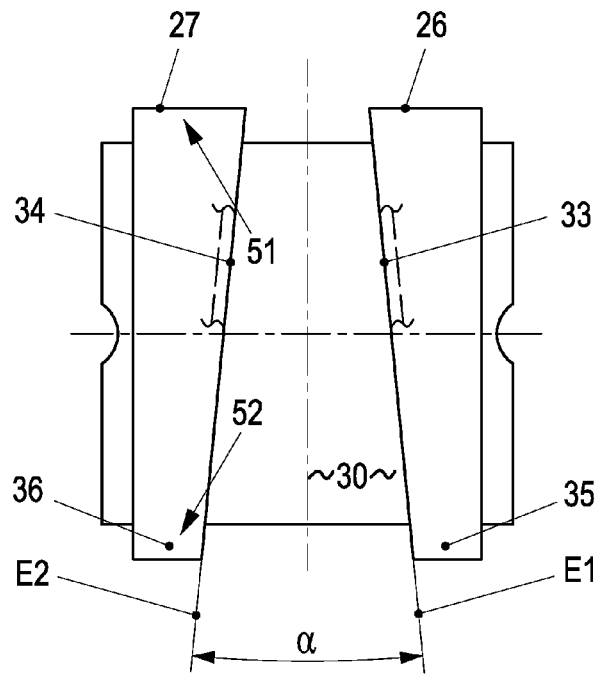
FIG. 4 is a schematic view in the direction of the arrow Y from FIG. 3.

Originating from a first ring section 51 of the bearing ring jackets 35 and 36 of the cylinder bodies 31 and 32, which is directed toward the piston crown 18, to a second, opposing ring section 52 of the bearing ring jackets 35 and 36, which is directed toward the crankshafts 13 and 14, the base walls 33 and 34 of these cylinder bodies 31 and 32, together with the planes E1 and E2, diverge in a V-shaped manner so as to form an intermediate space 30. In this process, the planes E1 and E2 enclose an acute angle α, FIG. 4.

The bearing bushings 40, 41 and 42, 43 protrude with a defined distance As beyond radial delimiting planes 53 and 54 of the bearing ring jackets 35 and 36. Each bearing ring jacket, e.g., 35, is provided on an inside 55 with first local thickened sections 56 and 57 in the region of the bearing bushings 40 and 41. Moreover, in a region facing the crankshafts 13 and 14 and spaced from the connecting rod end transverse plane 50, the bearing bushings 40 and 41 comprise second thickened regions 58 and 59 between the first thickened sections 56 and 57 and the bolt boreholes 44 and 45 of the bearing bushings 40 and 41.

Figure 5:
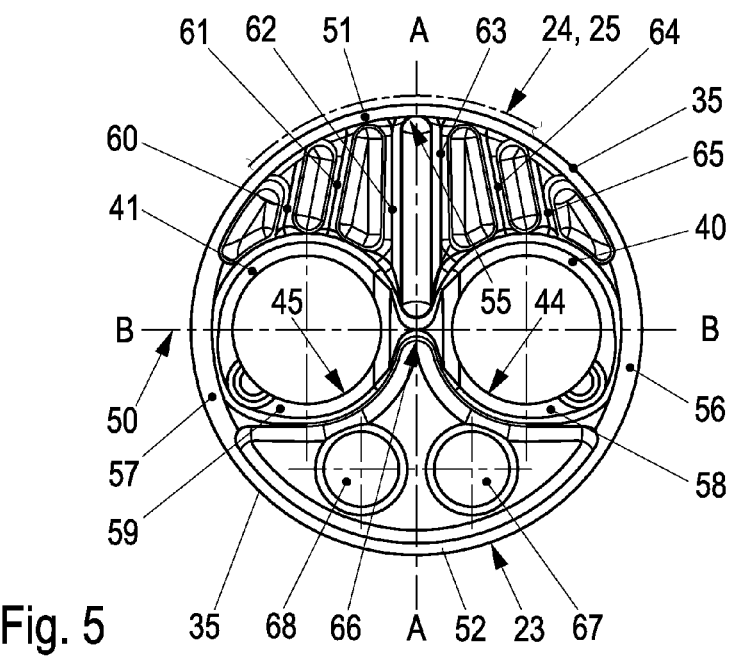
FIG. 5 shows a representation of the pivot bearing according to FIG. 2.

From the inside 55 of the first ring section 51 of the bearing ring jackets 35 and 36, one or more reinforcing ribs 60, 61, 62, 63, 64 and 65, FIG. 5, or 60', 61' and 62', FIG.

7, extend in the direction of the bearing bushings 40 and 41. For example, at least one reinforcing rib, e.g., 61', extends radially in the center longitudinal axis A-A of the piston 2 between the inside 57, e.g., of the bearing ring jackets 35 and 36, and a transverse web 66 that connects the bearing bushings 40 and 41 and is located on the connecting rod end plane 50. The other reinforcing ribs combine the inside 55 with the bearing bushings 40 and 41 in a secant-like manner. Finally, the base walls 33 and 34 of the cylinder bodies 31 and 32 have one or more through-passages 67, 68, FIG. 5, and 69, 70, FIG. 6, between the connecting rod end transverse plane 50 and the second ring section 52 so as to reduce the weight.

The dimensioning of the pivot bearing 23 essentially depends on the rating of the internal combustion engine 1. At a diameter of 18 mm of the bolt boreholes 44, 45 and 46, 47 and an outside diameter of 54 mm of the cylinder bodies 31 and 32, wall thicknesses in the range of approximately 2 mm for the bearing ring jackets 35 and 36, the base walls 33 and 34, and the reinforcing ribs are suitable; the wall thickness of the bearing bushings may be larger, for example depending on the load. Iterative and/or arithmetic methods are suitable for defined dimensioning. A comparable methodology can also be used to design the cross-sections of the connecting supports 37, 38 and 39.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A pivot bearing for two connecting rods in at least one piston of an internal combustion engine equipped with two crankshafts driven via the piston and the two connecting rods, the pivot bearing being accommodateable in piston bore holes of the piston, the pivot bearing comprising:

radial bearing regions that are provided with bolt bore holes and that are disposed on either side of a center longitudinal axis of the piston, the radial bearing regions delimiting the connecting rod ends and forming an intermediate space, and the bolt bores holes being configured to mount connecting rod bolts for ends of the two connecting rods, wherein the radial bearing regions are configured as cylinder bodies having a crucible-shaped cross-section on a side of each cylinder body that face away from a center of the pivot bearing, each cylinder body has a base wall and a bearing ring jacket, with a portion of each bearing ring jacket forming a cylindrical side wall portion of the crucible-shaped cross-section, the base walls of the two cylinder bodies extend at a distance from each other, and the bearing ring jackets surrounding the base walls are guided away from the base walls in opposite directions, one or more connecting supports extend between the base walls, the bearing ring jackets cooperate with the piston bore holes in a rotatably movable manner, the base walls are connected to bearing bushings which are oriented in an axial direction of the pivot bearing into which the bolt bore holes are incorporated, the bearing bushings extending axially away from the center of the pivot bearing into the crucible-shaped cross-section, and the pivot bearing is made of a material that provides a low-weight construction.

2. The pivot bearing according to claim 1, wherein the material is cast steel for components that have a high load-bearing capacity, statically and dynamically, and are subjected to especially high wear.

3. The pivot bearing according to claim 1, wherein the material used is an ultra-high carbon lightweight steel.

4. The pivot bearing according to claim 1, wherein:

three connecting supports are provided between the base walls of the cylinder bodies, of which two connecting supports are attached in a direction of a piston crown of the piston at a distance from a connecting rod end plane intersecting centers of the connecting rod bolts of the connecting rod ends on the one hand, and at a distance from the center longitudinal axis of the piston on the other hand, and the third connecting support, in the direction of the crankshafts, is disposed spaced from the connecting rod end plane and on the center longitudinal axis.

5. The pivot bearing according to claim 4, wherein, originating from a first ring section of the cylinder bodies, which is directed to the piston crown, to a second, opposing ring section of the cylinder bodies, which is directed toward the crankshafts, the base walls of the cylinder bodies diverge in a V-shaped manner so as to form the intermediate space for the connecting rod ends in a defined manner.

6. The pivot bearing according to claim 1, wherein the bearing bushings protrude at a defined distance beyond radial delimiting planes of the bearing ring jackets.

7. The pivot bearing according to claim 1, wherein each bearing ring jacket on an inside in the region of the bearing bushings is provided with first local thickened sections.

8. The pivot bearing according to claim 7, wherein, in a region facing the crankshafts and spaced from the connecting rod end plane, the bearing bushings comprise second thickened sections between the first thickened sections and the bolt boreholes of the bearing bushings.

9. The pivot bearing according to claim 1, wherein, originating from the inside of the first ring section, one or more reinforcing ribs are provided in the direction of the bearing bushings.

10. The pivot bearing according to claim 9, wherein, on the one hand, at least one of the reinforcing ribs in the center longitudinal axis of the piston runs radially between the inside of the bearing ring jackets and a transverse web that connects the bearing bushings and is located on the connecting rod end plane, and that, on the other hand, multiple further reinforcing ribs combine the inside of the first ring section with the bearing bushings in a secant manner.

11. The pivot bearing according to claim 1, wherein the base walls between the connecting rod end plane and the second ring section have one or more through-passages so as to reduce the weight.

* * * * *